June 3, 1958     E. H. HECKETT     2,837,289
TUMBLER BARREL FOR IMPACT CLEANING OF METAL SCRAP
Filed Sept. 12, 1955     2 Sheets-Sheet 1
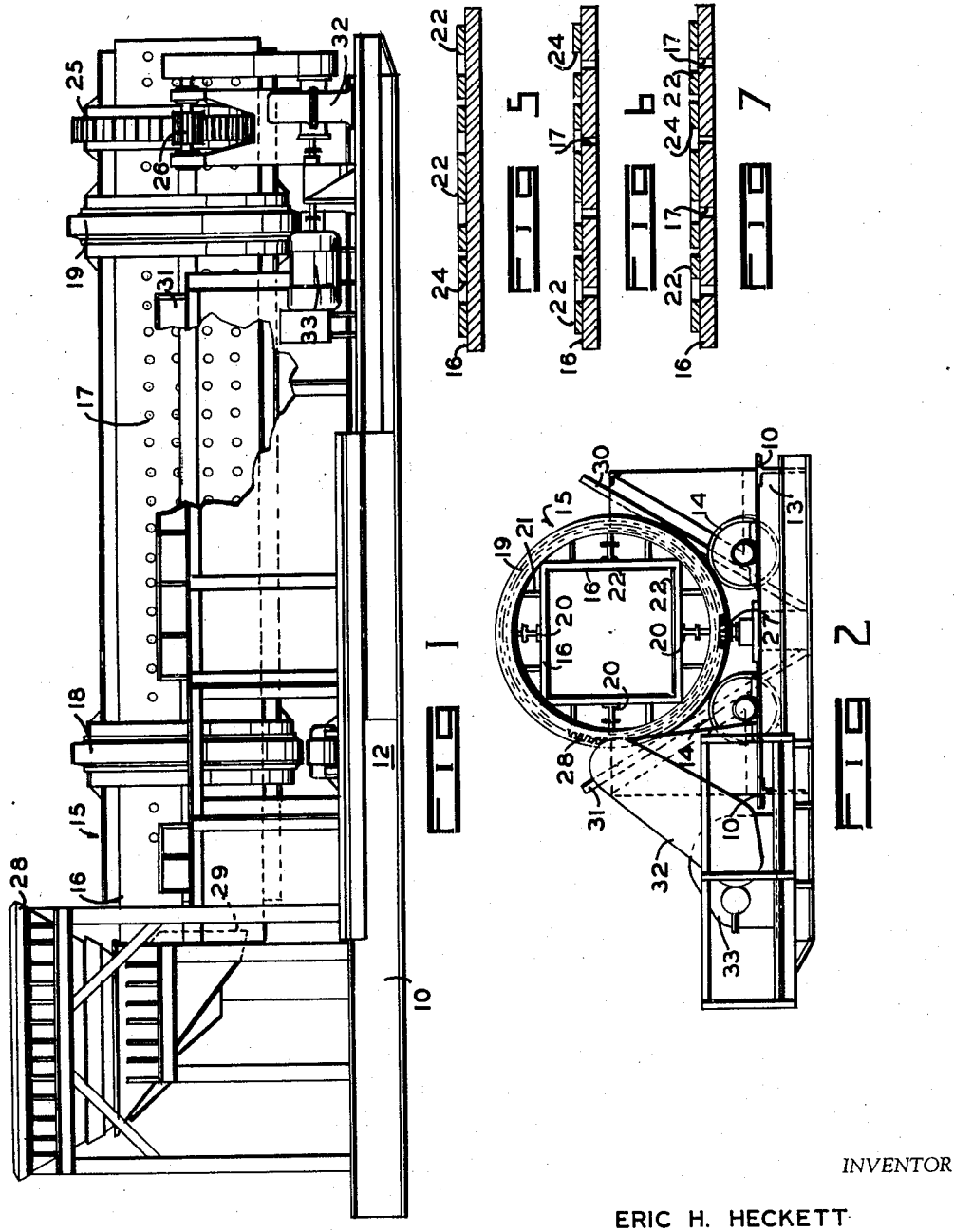
INVENTOR
ERIC H. HECKETT
BY Francis J. Klempay
ATTORNEY

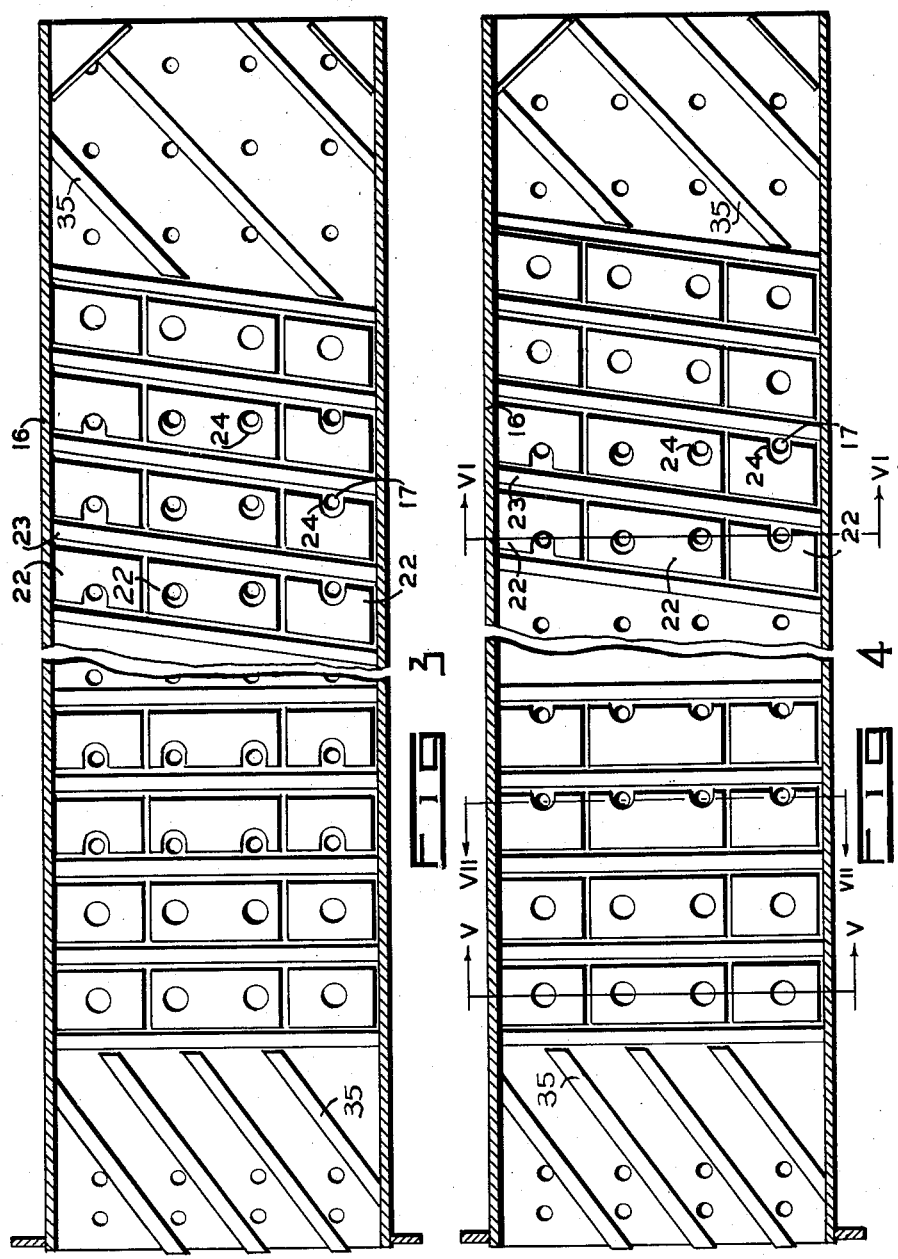

United States Patent Office 2,837,289
Patented June 3, 1958

2,837,289
TUMBLER BARREL FOR IMPACT CLEANING OF METAL SCRAP

Eric H. Heckett, Valencia, Pa., assignor to Harsco Corporation, Harrisburg, Pa., a corporation of Delaware Application September 12, 1955, Serial No. 533,623

7 Claims. (Cl. 241—91)

This invention relates to improved apparatus for the cleaning of metal scrap and the like and more particularly to an improved tumbler barrel construction as well as an improved arrangement for feeding the scrap through the tumbler barrel whereby the cleaned material is discharged at one end of the tumbler and the waste slag particles or fines are disposed of. The invention has as its primary object the provision of apparatus of this general nature which has as its characteristics extreme ruggedness and durability and being of greatly increased capacity by reason of its large physical size and improved method for effecting the continuous flow of materials through the tumbler barrel in order that it may be operated in a continuous and economical manner.

The apparatus of this invention is intended specifically for substantially continuous use in connection with the recovery of reusable metal scrap from the slag and refuse of steel making operations such as disclosed in my prior U. S. Patents Nos. 2,264,204 issued November 25, 1941, and 2,352,712, issued July 4, 1944. As indicated in these patents large quantities of reusable scrap metal are contained in the slag and refuse which has previously been dumped and discarded from most steel making plants for lack of proper and economically feasible recovery methods. It has accordingly been my object to develop general plant facilities and methods whereby the reusable scrap metal may be recovered by practical methods for later reuse in charging steel-making furnaces. As stated in my prior patents, the amount of reusable scrap previously discarded has been of enormous quantity and recovery and reuse of this metal will greatly benefit the steel making plants in operation today, resulting in lower costs and higher operating efficiencies.

One of the problems encountered is that the reusable metal scrap is encrusted with hard masonry materials and with hard slag, both having highly tenacious adherence and the prior method of removing these impurities to bring the percentage of metal scrap content up to the point where it was acceptable for reuse in the furnaces were both costly and difficult to operate which has resulted in the loss of substantial metal tonnage by discarding and dumping of these materials.

Another object of this invention is to provide apparatus capable of carrying out reusable recovery procedures that can be employed in a practical manner as a permanent installation near or adjacent a steel producing plant whereby continuous recovery operations can be carried out. These general objects are accomplished, in accordance with the teachings of my invention, by providing an impact cleaning apparatus that is of such size, physical strength, and durability that the same may be operated continuously to clean an endless stream of heavy and large irregular shaped pieces of the material specified.

The general construction of this machine is taught in my copending U. S. Patent application Ser. No. 295,461, filed June 25, 1952, now U. S. Patent No. 2,726,815, as being of an improved tubular apparatus having essentially square side walls with a plurality of apertures in them for the fines to drop through and are later disposed of. The general side walls are held in position by circumscribing ring-like bearing members and longitudinally extending beams being attached on one side to the side walls and on the opposite extremity to the ring-like bearings. The construction is such that the apparatus is of a compact nature and is capable of withstanding the large impact forces resulting from continuous tumbling. To carry out the tumbling the side walls are rotated by power means so that the material to be cleaned is continually agitated during the process. In the apparatus disclosed in my previous application it was necessary to so mount the tumbler that it was pivotable about its outlet or discharge end in order that the rate of feed by gravity could be controlled and that proper movement of the material through the barrel was insured.

It is therefore another specific object of this invention to provide an improved tumbler barrel construction wherein it is not necessary to raise or lower one end of the barrel to insure proper operation. In accordance with this objective a plurality of different shaped and angled wear plates are attached to the working surfaces of the side walls and are so arranged that a threaded screw-like working surface is obtained which properly controls the rate of flow of the specified material. It will be readily understood that the rate of flow will be dependent upon the angle or "pitch" of the threaded portion. In this manner it is unnecessary to provide the tumbler with tilting means which results in a more economical machine to build and construct and is more automatic since it does not require the same amount of operator attention.

The above and other objects and advantages of the invention will become apparent upon consideration of the following detailed specification and accompanying drawings wherein there is disclosed a preferred embodiment of the invention.

In the drawing:

Figure 1 is a side elevation of a continuous tumbler barrel and associated apparatus, all constructed in accordance with, and for the purpose advance by my invention;

Figure 2 is an end elevation of the apparatus in Figure 1;

Figure 3 is a plan view of the wear plates and side walls which will be further described;

Figure 4 is a plan view of another arrangement of the wear plates and side walls which will be further described; and Figures 5, 6 and 7 are end section views taken along section lines V, VI, and VII in Figure 4.

Referring now to the drawings and initially to Figures 1 and 2 thereof, the tumbler barrel apparatus comprises a framework of structural members including longitudinally disposed beams 10 which are firmly attached to a concrete foundation, not shown, in the general area of the slag dump where recovery operations will take place. The longitudinally extending beams 10 form a supporting platform 12 for the tumbler barrel proper and certain other equipment appurtenant thereto. Spaced longitudinally on the supporting platform 12, and mounted on transversely disposed structural members 13, are spaced pairs of heavy duty supporting rolls 14 which serve to rotatably support an elongated tumbler barrel 15 to be hereinafter more fully described.

In accordance with the teachings of the invention the tumbler barrel is preferably of rectangular cross-section as illustrated in Figure 2. It should be understood, however, that the barrel may be easily constructed with a multiplicity of sides to form a tumbler of any other polygon cross-section. The selection of the number of sides of course is not important to the theory of operation and the cross-sectional shape of the tumbler may be dictated by the type of material specifically being cleaned in the particular installation. In the preferred embodiment of the invention a rectangular cross-section has been found well adapted to the cleaning of steel scrap.

The tumbler barrel 15 comprises four elongated substantially flat side members 16 of heavy steel plate having therein a large number of apertures 17 of predetermined size and spacing, depending on such factors as the nature of the material to be treated therein and the end product desired. A plate thickness of the order of two inches and an aperture size of two inches is presently contemplated.

Positioned inwardly of the ends of the barrel 15 and spaced equally with the supporting rolls 14 are ring-like bearing members 18 and 19 which are rigidly secured to the side plates 16, in circumscribing relation thereto, and there are provided a plurality of I-beam reinforcing members 20 which extend longitudinally of the side wall plates 16, intermediate the side edges thereof, and positioned between the side wall plates 16 and the bearing rings 18 and 19. The arrangement is such that the reinforcing beams 20 are restrained at fixed and spaced points by the rings 18 and 19 against radial expanding movements such as would tend to be caused by the outward forces of the tumbled material, and thus radial restraint is imparted to the whole length of the side wall plate through the longitudinal reinforcement beams. The bearing rings are also supported by various webbing 21 whereby the barrel 15 is supported by and rotated on the rolls 14 in the manner desired for breaking away the reusable steel particles from the slag and/or the masonry crust.

In my previous application, Ser. No. 295,461, which has since matured in to U. S. Patent No. 2,726,815, it is taught that the tumbler barrel 15 should be inclined at an angle with the horizontal in order to insure proper feeding by gravity of the charge through and out the discharge end of the barrel. It is one of the specific features of this apparatus that the tumbler can be placed horizontally and parallel to a supporting base and still result in proper feeding of the material. To accomplish this purpose a plurality of wear-plates 22 and pieces 23 are attached to the working surfaces of the flat side wall plates in the manner shown in Figures 3–7 as will be described in further detail.

Referring to Figures 3 and 4, the wear-plates 22 and pieces 23 are attached, preferably welded, to the flat side wall plates 16 and each wear-plate has one or more apertures 24 of larger diameter than the spaced apertures 17 in the side plates. The positioning of any given aperture 24 depends on the final placement of the wear-plate on the side walls, the arrangement being such that any given set of apertures 24 and 17 are substantially aligned on the same axis and in no case do the wear-plates block or cover the apertures 17 of the side wall plates 16. The work pieces 23 are of generally the same thickness as the wear plates 22 and are also joined to the side members in such a manner that none of the apertures 17 are obstructed or blocked. The wear-plates 22 and pieces 23 are mounted on the side members 16 in generally transverse relation to the movement of scrap through the tumbler. It is intended that for approximately the first half of the length of the side members the wear-plates 22 and pieces 23 will be perpendicular to the edges of the side wall plates 16, while on the other half toward the discharge end, the wear-plates 22 and pieces 23 are angularly inclined toward the discharge end. The utility of this construction will become readily apparent upon further consideration of the operation of the barrel tumbler.

As is readily apparent by comparing Figures 3 and 4 the wear-plates 22 and pieces 23 toward the discharge end of the tumbler are not connected in the same relation on adjoining sections of the side wall plates 16. It is contemplated that all of the side plates 16 will have an equal number of slanting wear-plates 22 and pieces 23 but that the area covered by these plates and pieces will be staggered with respect to the corresponding members on another and cooperating side plate 16 as shown in the Figures 3 and 4. The arrangement is such that when the side plates are assembled to form the tumbler 15 that the wear-plates 22 and pieces 23 form a substantially continuous threaded working portion to force the slag material through the tumbler 15 and out the discharge end. When the barrel 15 is rotated the material being worked is agitated and tumbled and thereby will be carried forward toward the discharge end by the screw action of the slanted wear-plates 22 and pieces 23.

It will be noted that the opposite end portions of the side wall plates 16 have attached thereto, by welding or other convenient attachment means, a plurality of forwardly inclined wear-plates or pieces 35 of relatively thin width dimension which are positioned intermediate the apertures 17 in the side wall plates so as not to block or obstruct the same. The wear-plates 35 have a considerably greater angle of inclination than the inclined wear-plates 22 and pieces 23 and the effect of these wear-plates 35 is to provide rapid charging and discharging of the tumbler barrel. As is readily apparent, the wear-plates 35 adjacent the charging end of the barrel will quickly move material into the main impacting areas (composed of the wear-plates 22 and pieces 23) and those wear-plates 35 adjacent the discharge end will quickly move the cleaned metallic particles out of the tumbler barrel after the same have moved through the above mentioned impacting areas.

In the preferred method of operation the barrel 15 is open at both ends so that upon a charge of steel-bearing slag being fed into the first end by the action of rotation thereof continual feeding will occur forcing the slag forward past the perpendicularly arranged wear-plates 22 and pieces 23 until it comes in contact with the wear-plates and pieces that are slanted toward the outward end thereby providing a continuous groove not unlike the threaded rings in a nut or screw. When the charge advances to this position the threaded portions and the continued rotation of the tumbler barrel acts to carry the steel-bearing slag toward the outlet end. In this manner, with the threaded groove, it is not necessary to incline the barrel so that the action of gravity will force slag through the barrel. Obviously this is a very desirable feature since it is unnecessary to provide costly and cumbersome tilting and pivoting equipment.

The rate of feed of the scrap will depend mainly on the angle that the wear-plates 22 and the pieces 23 are inclined toward the outlet end. The more the inclination the faster the material being worked will be drawn through the apparatus. To this end the apertures 24 are of much larger diameter than the apertures 17 in the side wall plates as shown in sectional views, Figures 5–7, thereby allowing the angle of inclination to be changed without complete redesign of the wear plates, thus reducing substantially the number of different shaped wear-plates that are needed. In this method of construction many of the wear-plates 22 and pieces 23 will be made out of very hard magnesium alloy steel to resist abrasion due to the rubbing of the scrap material against the wearing surfaces. In such a tumbler it is impossible to distribute the wear evenly across the surface of the barrel so that some wear-plates will receive more wear than others and as a consequence must be replaced more often than other particular wear-plates. Therefore only several small plates or pieces may be replaced instead of the entire side wall plates which is much more costly and time consuming.

In the illustrated embodiment of the tumbler barrel apparatus the barrel 15 is rotated in the manner desired by means of a large ring gear 25 which is positioned concentrically about the barrel 15 near the discharge end thereof and which cooperates with the pinion gear 26 carried by the supporting platform 12. The pinion gear is driven through a speed reducing gear box 32 by means of an electric motor 33 or other prime mover. And it is presently contemplated that the barrel 15 will be rotated at a speed in the order of ten to fifteen revolutions per minute. The barrel 15 is prevented from moving longitudinally during rotation by means of one or more antifriction thrust rollers 27 carried by the supporting platform 12 and adapted to engage the forward or right hand axial edge of the ring 18 and/or the ring 19.

For charging the tumbler barrel 15 with metal bearing material I provide adjacent the first or charging end of the barrel a large hopper 28 having a discharge opening 29 positioned within the mouth of the barrel 15 so that the material may be merely dropped in the hopper by suitable conveyor or crane apparatus, not shown. Preferably a crane, positioned intermediate the ends of the tumbler barrel, is used for charging since the same crane may also be used in conjunction with the cleaned metal disposed at the discharge end if desired.

According to the desired plan of steel plant operation, the fines, or small material, both magnetic and non-magnetic, passing through the apertures 17 during processing of the principal slag charge are collected and transported to another procesing station, not shown, wherein the fines may be separated into magnetic and non-magnetic classifications by the use of a magnet, also not shown. It is usually the case that the separated magnetic fine can be reused in charging the blast furnaces of a steel making plant in much the same way the cleaned scrap is used. It is of course understood that a greater proportion of slag may be present in a blast furnace charge than in an open hearth charge.

To collect the fines in the most expeditious manner I have provided angularly disposed collecting plates 30 and 31 along the lower side of the barrel 15 so that all the material passing through the apertures 17 will be collected and caused to flow through an opening between the angularly disposed plates 30 and 31. To facilitate the conveyance of the fines it is suggested that a continuous conveyor belt, not shown, longitudinally aligned with the opening and placed immediately below the opening be utilized to transport the fines to a suitable storage area substantially removed from the tumbler. Leading from this storage area may be other conveyors, not shown, arranged to convey the fines for further processing.

The invention thus provides a practicable and highly efficient method and apparatus for treating slag materials to recover therefrom usable free steel particles and usable steel-bearing slag particles. My present invention of course contemplates a preliminary treatment of the slag to break the same into particles of predetermined maximum size, as for instance eight inches, and possibly a preliminary magnetic separation of the large particles to select therefrom those bearing substantial quantities of steel. The steel-bearing particles selected in this manner are then subjected to further treatment in the barrel tumbler.

It should be apparent that I have accomplished the objects initially set forth. The invention disclosed herein provides for an improved tumbler barrel apparatus which is uniquely adapted for use in the impact cleaning of slag material resulting from steel operations so that the metal content of the slag thereby recovered may be reused in the furnaces.

Of particular importance in the present invention is the novel arrangement of using wear-plates of abrasive resistant steel to form the main wearing surface which are attached to the side walls of the tumbler barrel. By slanting the plates at an angle toward the discharge end to form a continuous threaded groove the slag is carried toward the discharge end without the tilting of the apparatus for the action of gravity. In the charging end of the tumbler barrel the wear plates are placed perpendicular to the edge of the side walls thus insuring proper feeding and agitation of the steel bearing slag in the tumbler barrel. The apparatus employing a multiplicity of these wear plates allows parts to be interchanged and the replacement of wear plates and pieces which receive the most wear easily without demanding a complete new side wall.

I also provide a novel arrangement for the reinforcement of the wear plates and side plates whereby the tumbler barrel is able to withstand the heavy impact forces to which it is subjected during continuous operation in the cleaning of steel bearing slag particles. I provide for this purpose a plurality of I-beams or similar structural reinforcing members are disposed longitudinally along the side wall members of the barrel, with the side wall members and the reinforcing I-beams being circumscribed by ring-like bearing members by which the barrel is rotatably supported. Thus, the circumscribing ring-like members prevent radial expansion of the reinforcing beams, while at the same time retaining force is applied to the length of the side wall members due to the anti-bending characteristics of the I-beams.

The apparatus provides for simultaneous and sequential impacting and agitation of the steel-bearing slag particles while the same are confined in a perforate container whereby the large particles of steel are broken free of the slag and the free slag is broken into small particles. The fine particles, both steel-bearing and non-steel bearing, are caused to be sifted through the apertures in the side walls and the wear-plates, leaving in the container large particles which are carried by the threaded forward end of the tumbler barrel to be discharged and for reuse in charging furnaces. The fine particles, after suitable magnetic separation and discarding of the non-steel bearing particles, may be reused in a blast furnace.

In accordance with the object of my invention I have provided means whereby the recovery of steel from steel-bearing slag may be carried out in an efficient and continuous manner since the slag output of a steel making plant may be treated at one installation. If desired the installation can be provided with means to adjust the speed of rotation so that compensation may be readily made for changes in the amount of slag or the type of slag processed.

It should be understood however that the specific embodiment herein described is intended to be illustrative only, as certain obvious changes may be made therein without departing from the scope or intent of the teachings of the invention. Reference should therefore be made to the following appended claims in determining the full scope of the invention.

I claim:

1. Impact apparatus for continuously recovering reusable metallics from steel-bearing slag particles comprising an elongated horizontally extending barrel-like member of continuous uniform multiple-sided tubular cross section, said barrel-like member having open ends thereby defining charging and discharging ends and being adapted to receive material to be broken at said charging end, said barrel-like member comprising a plurality of heavy side wall plates, and said side wall plates being perforated with apertures of predetermined size and spacing, a plurality of wear-plates rigidly attached to the inner working surface of each of said side wall plates along appreciable portions of the lengths thereof, at least some of said wear-plates being arranged in horizontally spaced and generally transversely extending but forwardly inclined spaced rows with respect to the axis of rotation of said barrel-like member, said forwardly inclined rows of wear-plates attached to any one of said side wall plates being offset horizontally from the forwardly inclined rows of wear-plates on others of said side wall plates, said offset relation of said rows of wear-plates thereby defining a substantially continuous thread-like portion of wear-plates on the internal surface of said barrel-like member for carrying material toward said discharge end, and apertures in at least a portion of said wear-plates whereby at least a portion of the apertures in said side wall plates are not blocked or obstructed.

2. Apparatus according to claim 1 further characterized in that other of said wear-plates are arranged in spaced rows on each of said side wall plates, said last mentioned spaced rows being normal with respect to the axis of said barrel-like member, said last-mentioned rows of wear-plates attached to any one of said side wall plates being transversely aligned with other rows of said last mentioned wear-plates on others of said side wall plates, the aligned relation of said rows of wear-plates thereby defining a plurality of spaced rings of wear-plates on the internal surface of said barrel-like member, and said spaced rings being adjacent said charging end of said barrel-like member.

3. Apparatus according to claim 2 further characterized in that said threaded portion extends approximately one-half the length of said barrel-like member adjacent said discharging end thereof, and said spaced rings comprise substantially the other portion of said barrel-like member.

4. Impact apparatus for continuously recovering reusable metallics from steel-bearing slag particles comprising an elongated horizontally extending barrel-like member of multiple-sided tubular cross section, said barrel-like member having open ends thereby defining charging and discharging ends and adapted to receive material to be broken at said charging end, said barrel-like member comprising a plurality of side wall plates, said side wall plates being perforated with apertures of predetermined size and spacing, a plurality of wear-plates rigidly attached to the inner working surface of each of said side wall plates along appreciable portions of the lengths thereof, at least some of said wear-plates being horizontally spaced from each other and forwardly inclined with respect to the axis of rotation of said barrel-like member, said forwardly inclined and spaced wear-plates on any one of said side walls being horizontally offset from the forwardly inclined wear-plates attached to others of said side wall plates, the offset relation of said wear plates thereby defining a substantially continuous thread-like portion of said wear-plates on the internal surface of said barrel-like member for carrying material toward said discharge end, and apertures in at least a portion of said wear-plates whereby at least a portion of the apertures in said side wall plates are not blocked or obstructed.

5. Apparatus according to claim 4 further characterized in that other of said wear-plates are attached to said side wall plates in formally inclined relation with respect to said axis of rotation, said other of said wear-plates positioned at said discharge end of said barrel-like member, and said other of said wear-plates having a greater angle of inclination than said first mentioned wear-plates.

6. Impact apparatus for continuously recovering reusable metallics from steel-making slag particles comprising an elongated horizontally extending barrel-like member of multiple-sided tubular cross section, said barrel-like member having open ends thereby defining charging and discharging ends and adapted to receive material to be broken at said charging end, said barrel-like member comprising a plurality of side wall plates, said side wall plates being perforated with apertures of predetermined size and spacing, a plurality of wear-plates rigidly attached to the inner working surface of each of said wall plates, a portion of said wear-plates adjacent the charging end of said barrel-like member being attached to said side wall plates in normal relation with respect to the axis of rotation of said barrel-like member, another portion of wear-plates positioned forwardly of said last mentioned wear-plates being attached to said side wall plates in forwardly inclined relation with respect to said axis of rotation, and apertures in at least some of said wear-plates whereby at least a portion of the apertures in said side wall plates are not blocked.

7. Apparatus according to claim 6 further characterized in that a third portion of said wear-plates positioned forwardly of said another portion thereof are inclined forwardly with respect to said axis of rotation, the inclination of said third portion being greater than the inclination of said another portion, and said third portion positioned immediately adjacent said discharge opening.

References Cited in the file of this patent

UNITED STATES PATENTS

| Number | Name | Date |
|---|---|---|
| 387,158 | Freygang | July 31, 1888 |
| 401,878 | Dodge | Apr. 23, 1889 |
| 688,229 | Hundeshagen | Dec. 3, 1901 |
| 957,436 | Morrison | May 10, 1910 |
| 1,367,777 | Hardinge | Feb. 8, 1921 |
| 1,859,560 | Hartshorn | May 24, 1932 |
| 1,934,930 | Kent | Nov. 14, 1933 |
| 1,966,312 | Rafetto | July 10, 1934 |
| 2,148,529 | Bucky | Feb. 28, 1939 |
| 2,189,711 | Eigenbrot | Feb. 6, 1940 |
| 2,264,204 | Heckett | Nov. 25, 1941 |
| 2,530,862 | Cornwell | Nov. 21, 1950 |

FOREIGN PATENTS

| Number | Country | Date |
|---|---|---|
| 12,058 | Great Britain | 1848 |